US007362475B2

(12) United States Patent
Toda et al.

(10) Patent No.: US 7,362,475 B2
(45) Date of Patent: Apr. 22, 2008

(54) IMAGE FORMING DEVICE FOR PROCESSING A FILE CONTAINING RASTER DATA AND VECTOR DATA

(75) Inventors: Katsumi Toda, Nagoya (JP); Kiyoji Muramatsu, Kasugai (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 711 days.

(21) Appl. No.: 10/299,302

(22) Filed: Nov. 19, 2002

(65) Prior Publication Data

US 2003/0095286 A1 May 22, 2003

(30) Foreign Application Priority Data

Nov. 19, 2001 (JP) ........................... P2001-353433

(51) Int. Cl.
*G06K 15/00* (2006.01)

(52) U.S. Cl. ..................... 358/3.28; 358/520; 715/537; 715/517

(58) Field of Classification Search ................ 715/526, 715/500, 525, 527, 864, 520, 517; 386/95; 358/3.07, 3.08, 3.09, 3.2, 3.22, 507, 1.13, 358/1.15, 1.3; 382/307, 305, 232, 199, 242; 345/135, 443, 428, 419, 619, 532, 1.1, 2.2
See application file for complete search history.

(56) References Cited

U.S. PATENT DOCUMENTS

| | | | | |
|---|---|---|---|---|
| 5,907,374 | A * | 5/1999 | Liu | 375/240.26 |
| 6,266,455 | B1 * | 7/2001 | Kobayashi | 382/307 |
| 6,847,467 | B2 * | 1/2005 | Obrador | 358/1.16 |
| 6,854,087 | B1 * | 2/2005 | Takeo et al. | 715/526 |
| 6,859,909 | B1 * | 2/2005 | Lerner et al. | 715/512 |
| 6,871,318 | B1 * | 3/2005 | Wynblatt et al. | 715/500.1 |
| 2002/0109729 | A1 * | 8/2002 | Dutta | 345/790 |

FOREIGN PATENT DOCUMENTS

| | | |
|---|---|---|
| JP | 1231176 | 9/1989 |
| JP | 4359281 | 12/1992 |

(Continued)

OTHER PUBLICATIONS

Golding, Mordy. Sams Teach Yourself Adobe Illustrator 9 in 24 Hours. Publication: Indianapolis, Ind Pearson Education, Inc. 2000. pp. 334-335, 228, 108-109.*

(Continued)

*Primary Examiner*—Jerome Grant, II
(74) *Attorney, Agent, or Firm*—Day Pitney LLP

(57) ABSTRACT

An image forming device for forming images based on a file configured of a first data area for storing raster data and a header for storing vector data. The image forming device includes a raster data image displaying function for forming images on a display screen based on the raster data; and a vector data displaying function for forming images on the display screen based on the vector data. With this construction, the image forming device can easily manipulate both vector data and raster data by combining both types of data in one file. The image forming device can rapidly combine both types of data in one image by using vector data in parts requiring high image quality and raster data in parts requiring high-speed drawing.

18 Claims, 12 Drawing Sheets

FOREIGN PATENT DOCUMENTS

| | | | |
|---|---|---|---|
| JP | 6230767 | | 8/1994 |
| JP | 7105353 | | 4/1995 |
| JP | 8-16143 | | 1/1996 |
| JP | 8171374 | | 7/1996 |
| JP | 8-305327 | | 11/1996 |
| JP | 8304327 | | 11/1996 |
| JP | 10084518 | * | 3/1998 |
| JP | 10-162022 | | 6/1998 |
| JP | 10-171346 | | 6/1998 |
| JP | 11-075113 | | 3/1999 |
| JP | 11291479 | * | 10/1999 |
| JP | 11-327789 | | 11/1999 |
| JP | 2000014481 | | 1/2000 |
| JP | 02000025279 | * | 1/2000 |
| JP | 2000198246 | | 7/2000 |
| JP | 2002207476 | * | 7/2002 |
| JP | 2003157072 | * | 5/2003 |

OTHER PUBLICATIONS

Adobe Illustrator File Format Specification http://partners.adobe.com/public/developer/en/illustrator/sdk/AI7FileFormat.pdf.*

* cited by examiner

IMAGE FORMING DEVICE FOR PROCESSING A FILE CONTAINING RASTER DATA AND VECTOR DATA

BACKGROUND OF THE INVENTION

1. Field of the Invention

The present invention relates to an image forming device for forming Images on an display device, such as a CRT display or a liquid crystal display.

2. Description of the Related Art

Conventionally, a PICT format is extensively used in Apple Macintosh computers. The PICT format enables both vector data and raster data to be processed in a single file. With the PICT format, the vector data is described in the file as "Drawing Command" and the raster data can also be stored in the file.

PostScript proposed by Adobe Systems Incorporated also enables both vector data and raster data to be processed in a single file. However, It takes a long time when the PostScript file is to be printed because a great deal of data must be processed. This is due to the fact that the raster data Is treated as a set of plural pieces of vector data in the PostScript file.

SUMMARY OF THE INVENTION

The present invention provides an image forming device that is capable of processing a file having a first data area for storing a first image data expressed as raster data and a second data area for storing data independent of the first image data including a second image data expressed as vector data. The second data area includes a plurality of sectors for storing respective ones of a plurality of sets of the second image data individually, so that a plurality of types of vector data can be treated as a single file. The image forming device includes a display device having a screen, a storage device for storing the file, a raster display unit and a vector display unit. The raster data display unit is provided for forming an image on the screen of the display device based on the first image data of the file stored in the storage device. The vector data display unit is provided for forming an image on the screen of the display device based on one of the plurality of sets of the second image data of the file stored in the storage device.

FIG. 1 shows an example file having the construction described above. In a file 1, a first image data having a raster data format is stored in a first data area B. Data independent of the first image data is stored in a header A in this example. The header of the file corresponds to the second data area. A plurality of sets of vector data 3 each including text and diagrams is stored in an area C of the header A. In FIG. 1, only one set of vector data 3 is shown for the sake of brevity. A file of this format is stored in the storage device. If it is desired that the file have a footer, the footer can be the second data area. The raster data display unit forms Images on the screen of the display device based on the first image data (raster data), while the vector data display unit forms images on the screen of the display device based on the second image data.

With an image forming device having this construction, the vector data and raster data are stored in a single file, facilitating management of the image data. The two image data formats can be rapidly combined using vector data in parts that require high image quality and raster data in parts that require high-speed image drawing.

FIG. 2 shows a sample file having the second image data made up of a set of coordinates determining a straight line or a curved line. In the file 1, vector data stored, for example, in the header serving as the second data area is a set 5 of numerical data for coordinate points determining a straight or curved line. An image forming device having this construction can reduce the size of the vector data.

It is preferable that the image forming device include a vector data selecting unit that selects at least one set of the second image data to be displayed on the screen of the display device from the plurality of sets of the second image data. An image forming device having this construction can selectively display suitable vector data according to need. For example, the image forming device facilitates the selective introduction of vector data over raster data.

It is also preferable that the image forming device further include a vector data switching unit that switches one set of the second image data selected by the vector data selecting unit to another set of the second image data stored in one of the plurality of sectors of the second data area at a predetermined time interval. An image forming device having this construction can facilitate the formation of video images. Here, the interval for switching the image need not be uniform. Further, when a plurality of sets of vector data is displayed initially, it is possible to switch only part of this data.

The functions executed by the image forming device described above can be implemented by a program executed by a computer, for example. In this case, the computer program is stored on a recording medium that can be read by a computer, such as a flexible disk, a magneto-optic disc, a CD-ROM, a hard disk, a ROM, or a RAM. The program is loaded into the computer and executed when needed. It is also possible to load the program into the computer via a network.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE EMBODIMENTS

Figure 3:
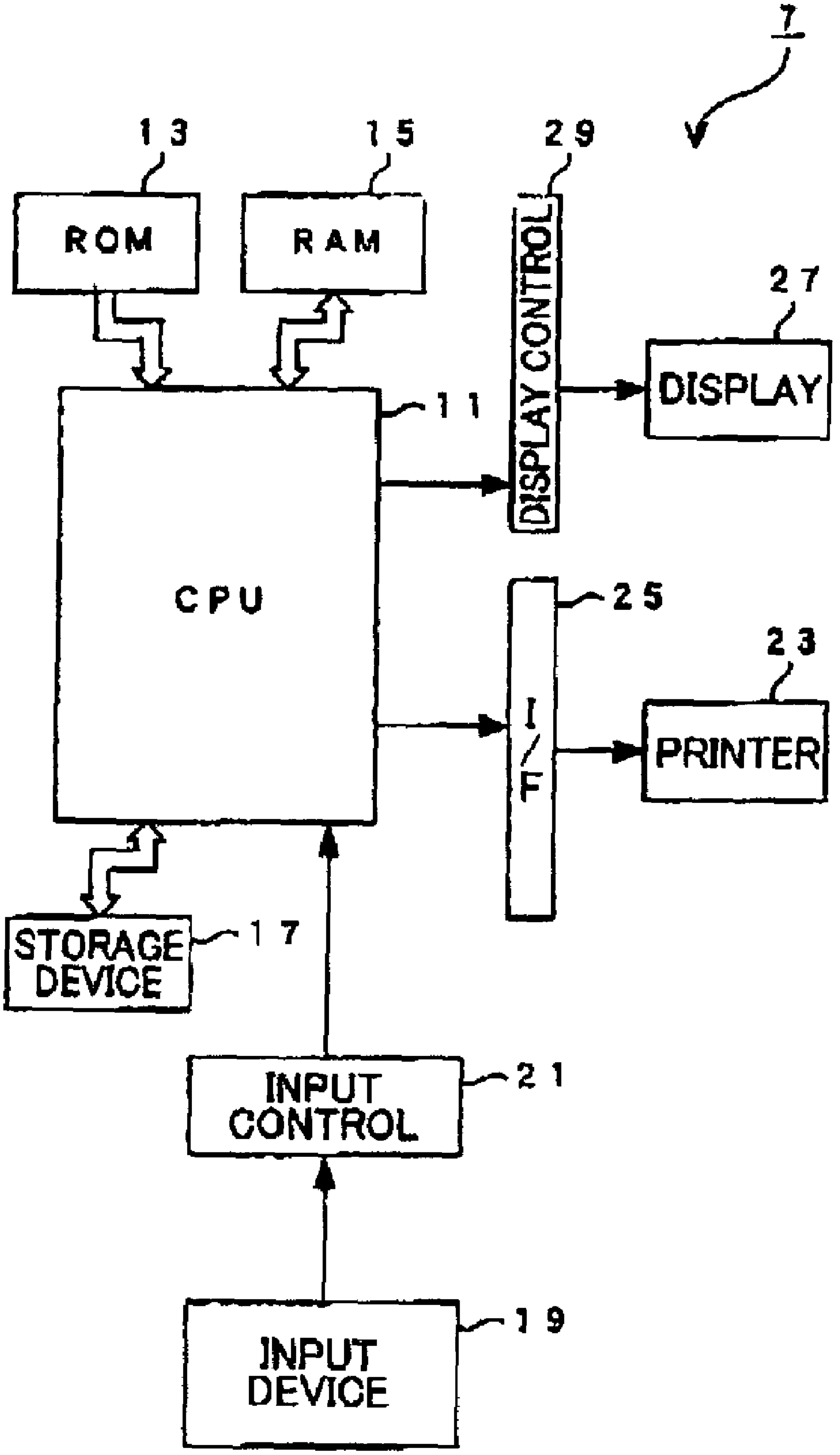
FIG. 3 is a block diagram showing the general construction of an image forming device according to one embodiment of the present invention.

An image forming device according to one embodiment of the present invention will be described while referring to the accompanying drawings. FIG. 3 is a block diagram showing an image forming device 7 according to the embodiment of the present invention. The image forming device 7 is configured as a computer system including a CPU 11 for executing various processes described later; a ROM 13 for storing programs executed by the CPU 11 and other data; a RAM 15 for temporarily storing various data generated during the processes; an external storage device 17; an input device 19 such as a keyboard or a mouse; an input control circuit 21 for transmitting signals from the input device 19 to the CPU 11, a printer 23, a printer interface 25 for exchanging data and signals with the printer 23, a display device 27 for displaying images and the like on a monitor screen, and a display control device 29 for controlling the display device 27. Examples of the external storage device 17 are a device for reading a recording medium, such as a flexible disk, a magneto-optic disk, or a CD-ROM, and a hard disk. In the present embodiment, the external storage device 17 is a magneto-optic disk reading device. Though not shown in the drawings, the image forming device 7 is connected to a clock having a calendar function.

Figure 1:
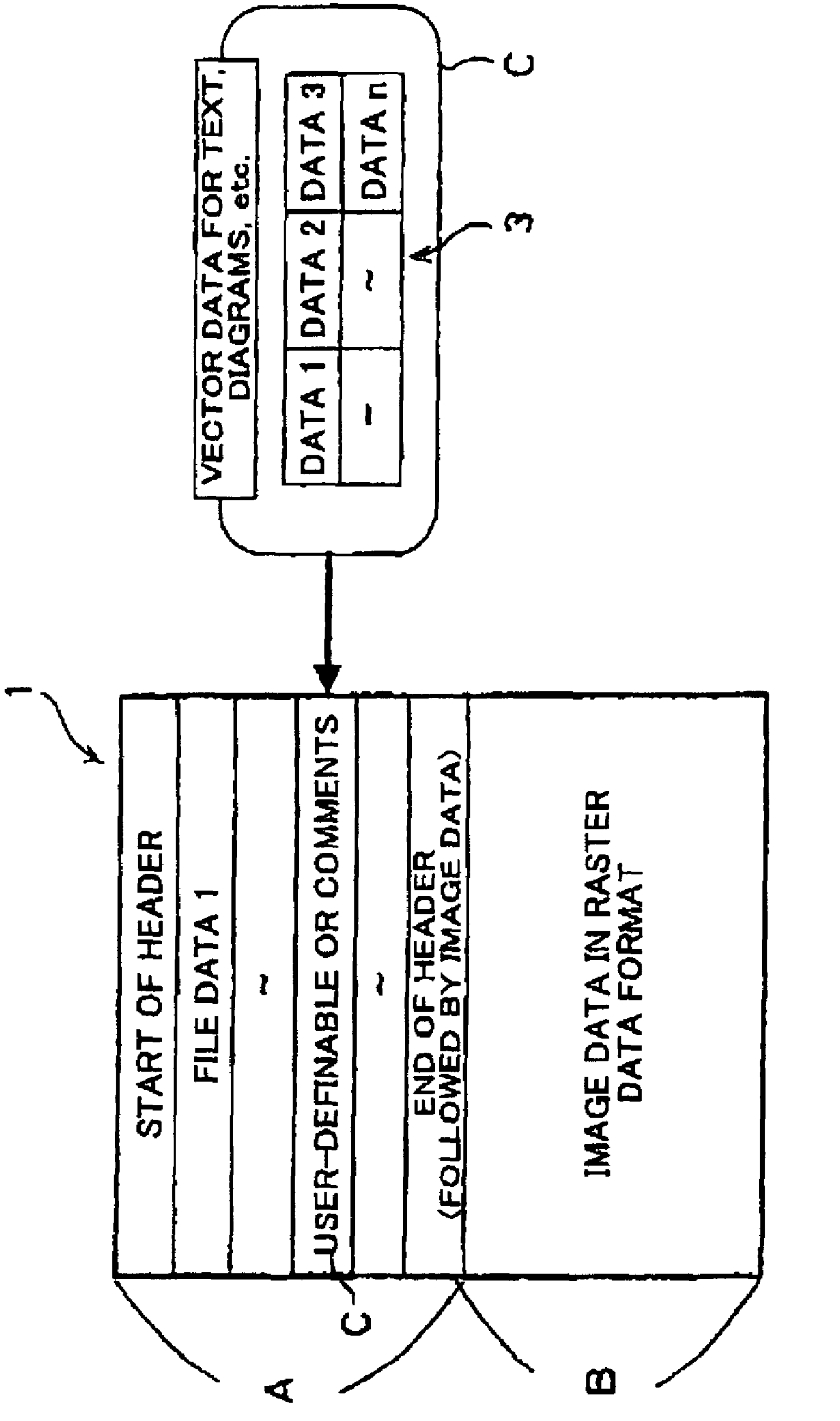
FIG. 1 is an explanatory diagram showing the construction of a file in which vector data is stored in a header A and raster data in an area B.
Figure 2:
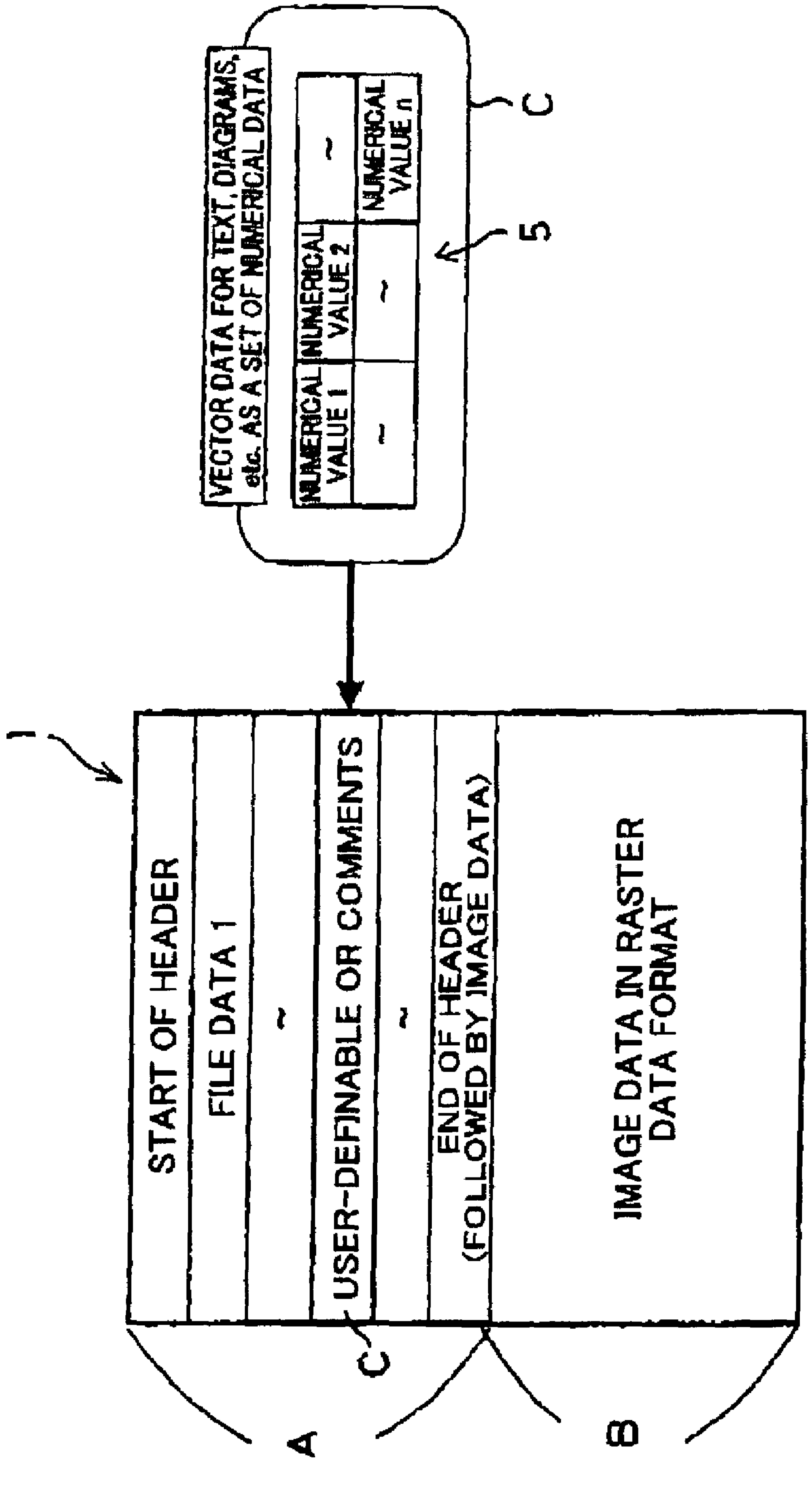
FIG. 2 is an explanatory diagram showing the construction of a file in which vector data formed of numerical data is stored in the header A.
Figure 4A:
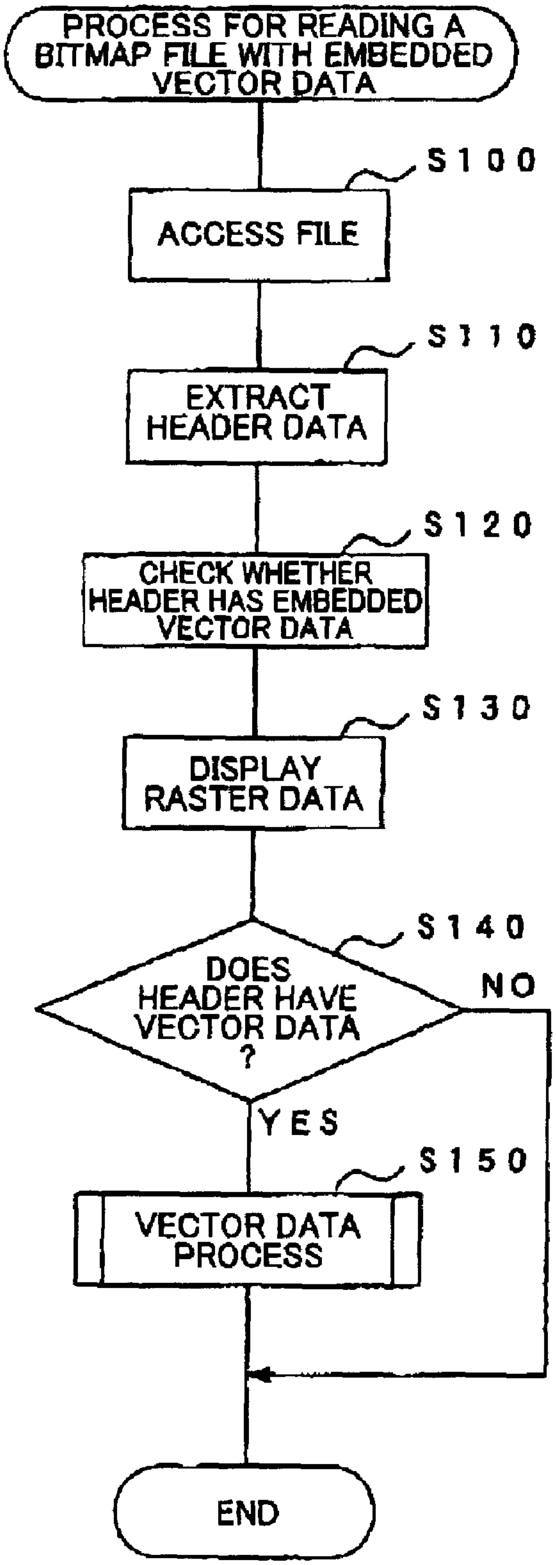
FIG. 4 includes flowcharts describing the process for displaying an image on a display device based on the file in FIG. 1.
Figure 4B:
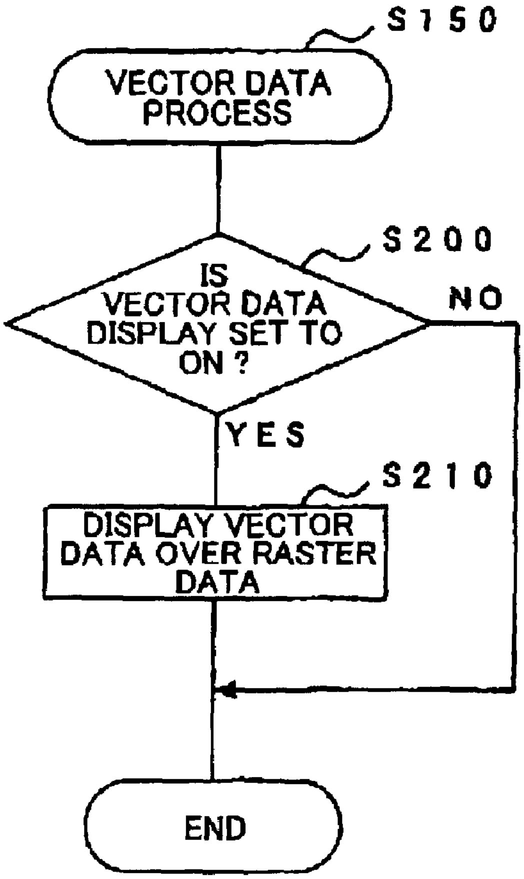

The flowchart in FIG. 4(*a*) shows a process executed by the CPU 11 for reading the file 1 having the format shown in FIG. 1 and displaying an image based on this file 1. This process is started when the user of the image forming device 7 performs a predetermined operation using the input device 19. At the beginning of the process, the image forming device 7 accesses the file 1 via the external storage device 17 in Step 100 (hereinafter Step is abbreviated to "S"). In S110, data in the header A is extracted from the file 1. In S120, the CPU 11 checks whether vector data is embedded in the header A. In S130, the raster data stored in the first data area B is displayed on the display device 27. In S140, the CPU 11 determines whether vector data exists based on the check in S120. When vector data exists, this data is processed in S150, and the current process ends. When vector data does not exist, the process ends without performing a vector data process.

FIG. 4(*b*) shows the vector data process. In this process, the CPU 11 determines in S200 whether the vector data display is set to ON or not. The user sets the ON/OFF setting of the vector data display using the input device 19. At the beginning of this process, a window (not shown) is, displayed on the display device 27, prompting the user to input a setting. When the vector data display is set to ON, the vector data is displayed in S210 over raster data displayed in S130, and the process ends. When the vector data display is set to OFF, the process ends without displaying vector data.

By combining sector data and raster data in a single file 1, the image forming device 7 can simplify the exchanging of files and other manipulation of files (copying, moving, transmitting, etc.). Both vector data and raster data can be combined rapidly by using vector data in places that require high-quality images and raster data in places that require high-speed drawing.

Figure 5:
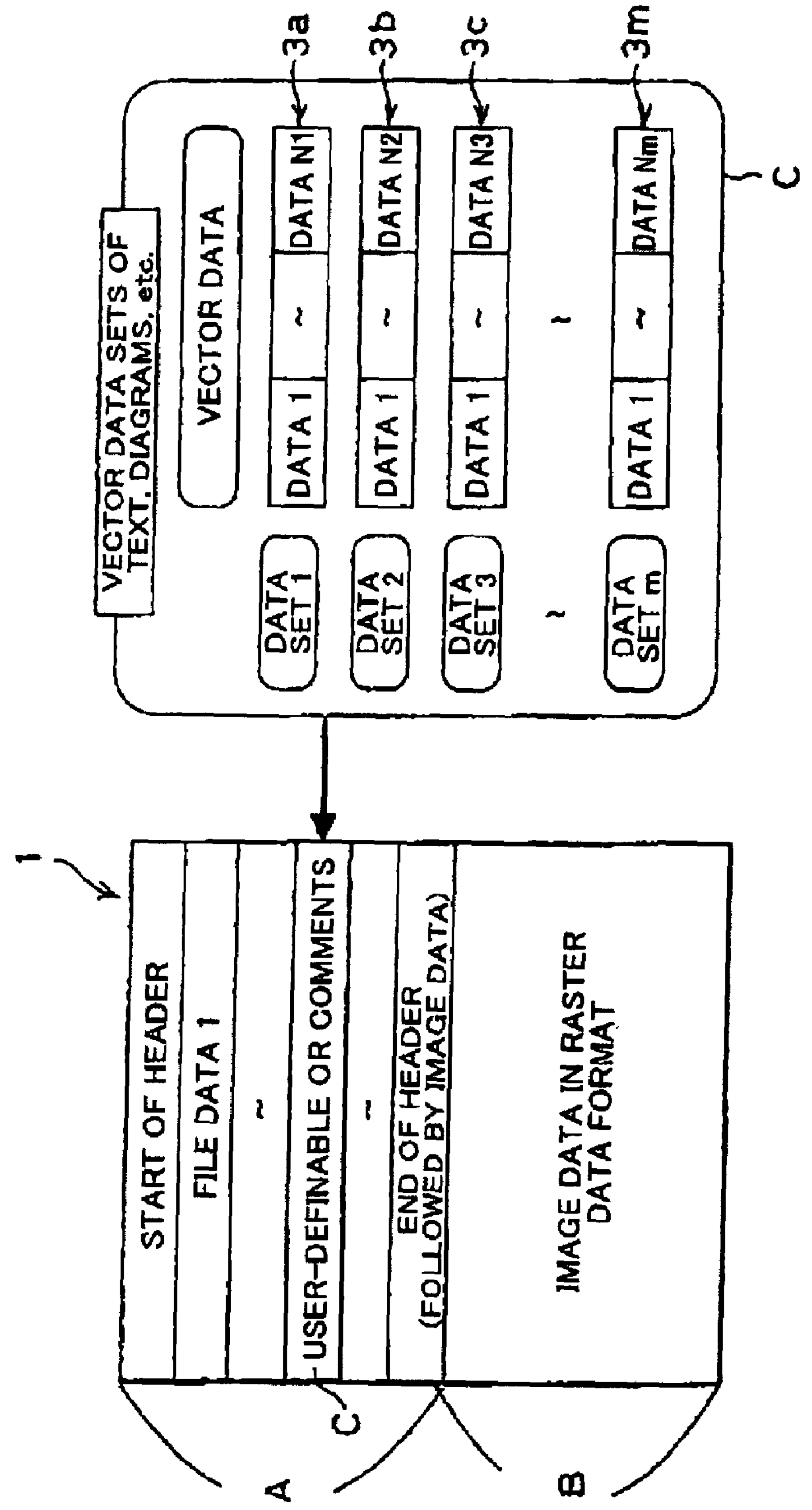
FIG. 5 is an explanatory diagram showing the construction of a file in which a plurality of vector data sets is stored in the header A.
Figure 6:
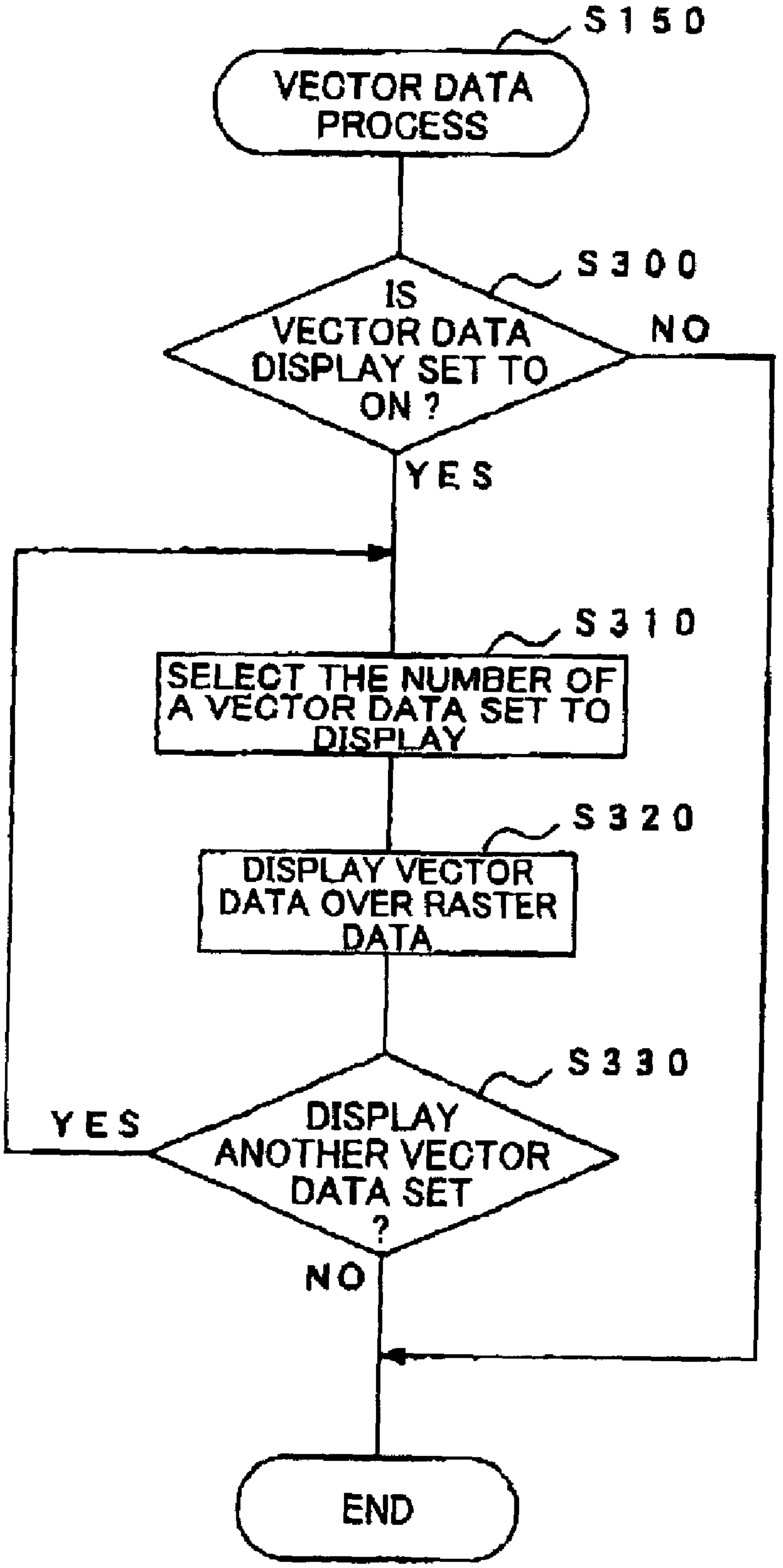
FIG. 6 is a flowchart describing the process for displaying an image on the display device based on the file in FIG. 5.

FIG. 5 shows the construction of the file 1 in which a plurality of vector data sets is stored in the header A. In the file 1 of the present embodiment, m vector data sets 3*a*-3*m* are stored in the header A. The flowchart in FIG. 6 shows a vector data process for displaying an image based on this file 1. The process for reading the file 1 and starting the vector data process when vector data exists is the same as the process described in FIG. 4(*a*). Therefore, a description of this process has been omitted, as well as the steps in the flowchart of FIG. 6. At the beginning of this process, the CPU 11 determines whether the vector data display is set to ON. This process Is the same as that in S200 shown In FIG. 4(*b*). When the vector data display is set to ON, the user is prompted in S310 to select a number of a desired vector data set in the group of vector data sets to display on the display device 27. More specifically, a window is displayed, prompting the user to input a selection specifying vector data to display on the display device 27. In S320, the selected vector data set is displayed over the raster data displayed in S130. In S330, the user is asked whether or not to display another vector data set. If the user indicates a desire to display another vector data set, the process returns to S310. If not, the process ends. If the vector data display is set to OFF (No in S300), the process ends with no further action.

In this way, it is possible when necessary to selectively display suitable vector data on the display device 27 superimposed on a raster data image.

Figure 7:
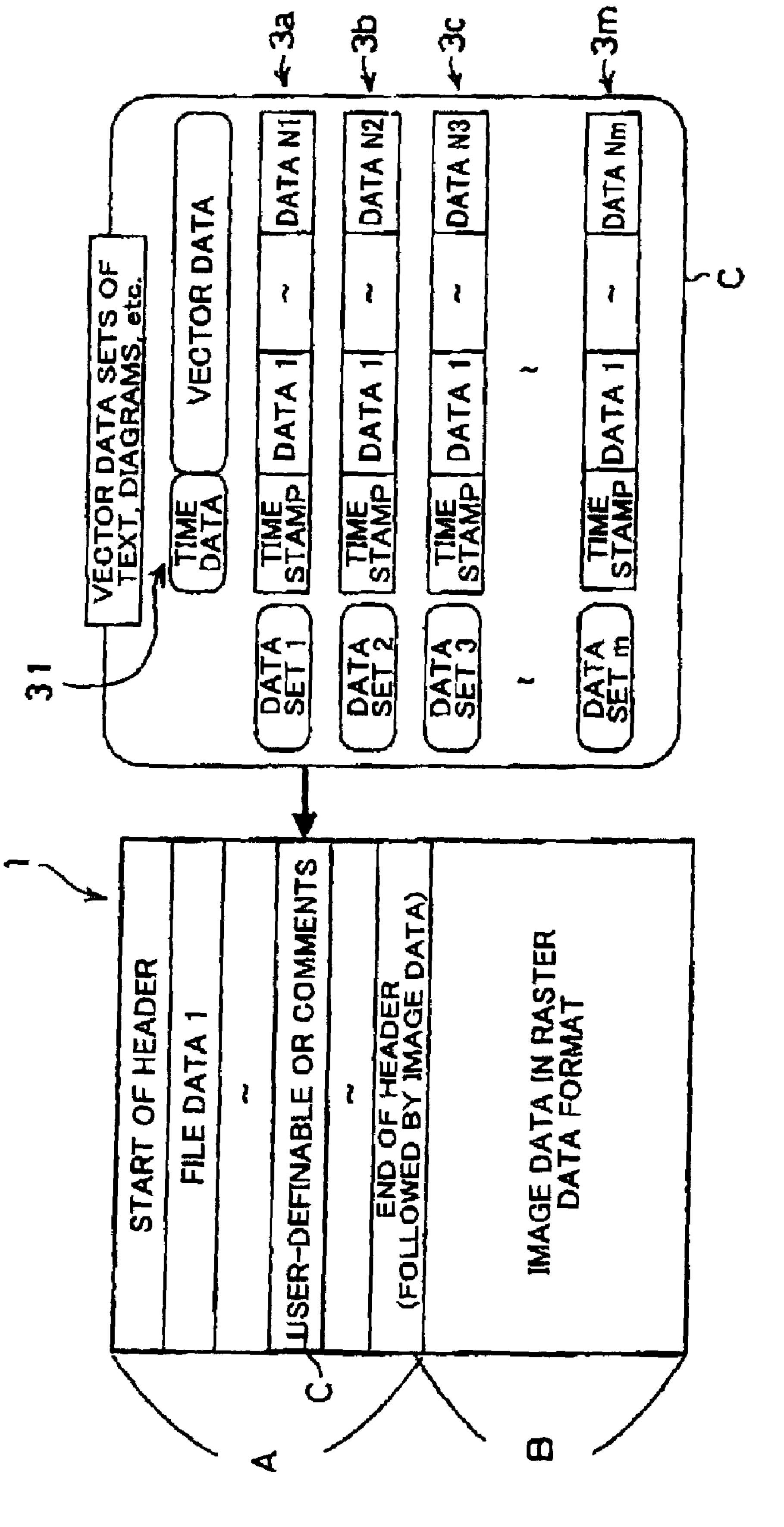
FIG. 7 is an explanatory diagram showing the construction of a file in which a plurality of vector data and their time stamps are stored in the header A.
Figure 8:
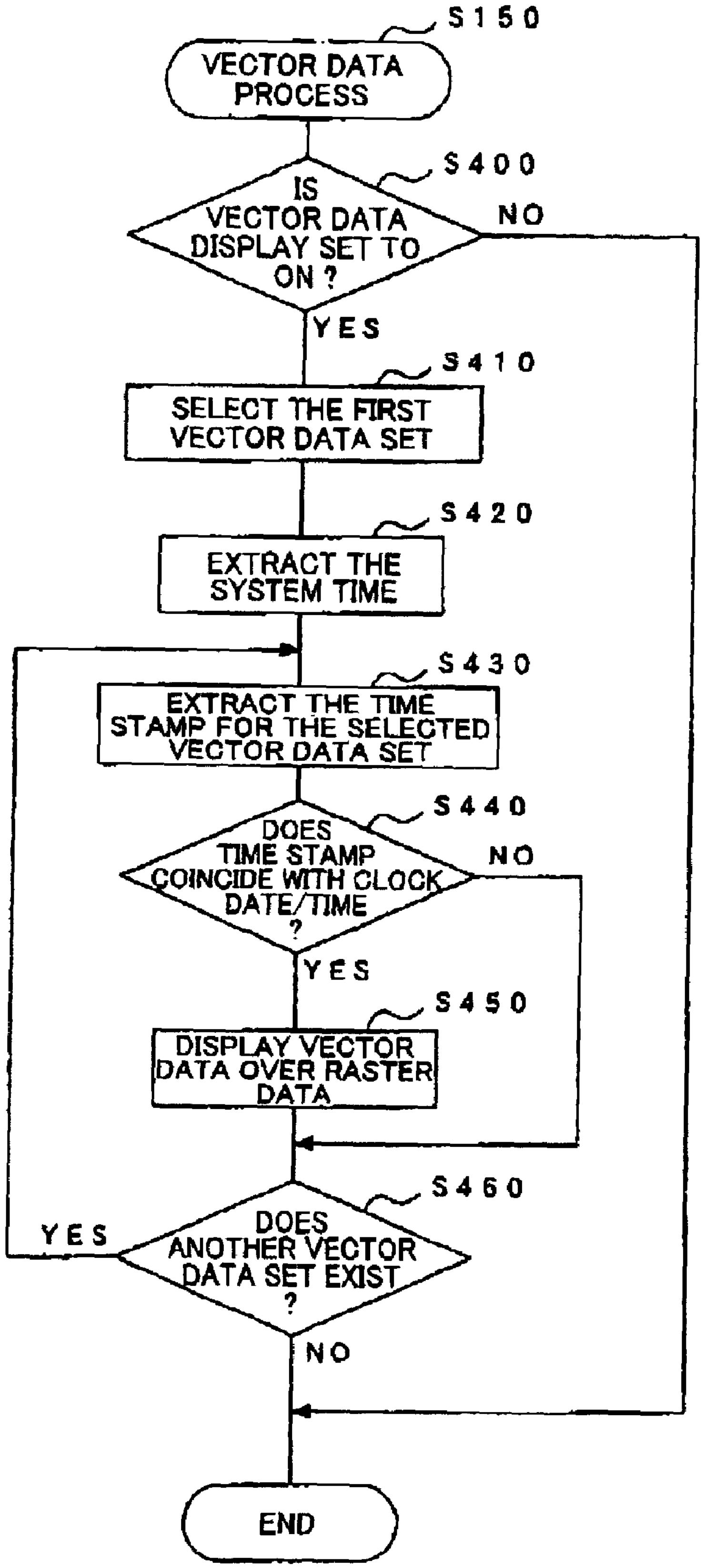
FIG. 8 is a flowchart describing the process for determining which vector data to display on the display device based on the time stamp and the current time.

FIG. 7 shows the file 1 having the format shown in FIG. 5, wherein a time stamp 31 is stored in each vector data set. The flowchart in FIG. 8 shows a vector data process for displaying an image based on a file 1 having the format shown in FIG. 7. The process for reading the file 1 and starting the vector data process when vector data exists is the same as that shown in FIG. 6. Therefore, a description of this process and the steps in the flowchart have been omitted. Further, the steps for determining whether the vector data display is set to ON and for ending the process with no action when the vector data display is set to OFF are the same as those in the vector data process of FIG. 1. When the vector data display is set to ON (Yes in S400), the first vector data set is selected in S410. In S420, the date/time is extracted from the clock of the image forming device 7. In S430, the time stamp indicating day and time is extracted from the selected vector data set. In S440, the CPU 11 determines whether the time stamp extracted in S430 is in coincidence with the clock date/time extracted from the image forming device 7 in S420. If the time stamp is in coincidence with the clock date/time, then a diagram based on this vector data set is displayed in S450 over the raster data displayed in S130. The process in S450 is not performed when the time stamp of this vector data set does not coincide the date/time for the image forming device 7.

In S460, the CPU 11 determines whether another vector data set exists. If another vector data set exists, the process returns to S430. The time stamp for that vector data set is extracted, and the process is repeated through S450 (or S440). The process ends when no vector data set exists.

Figure 9B:
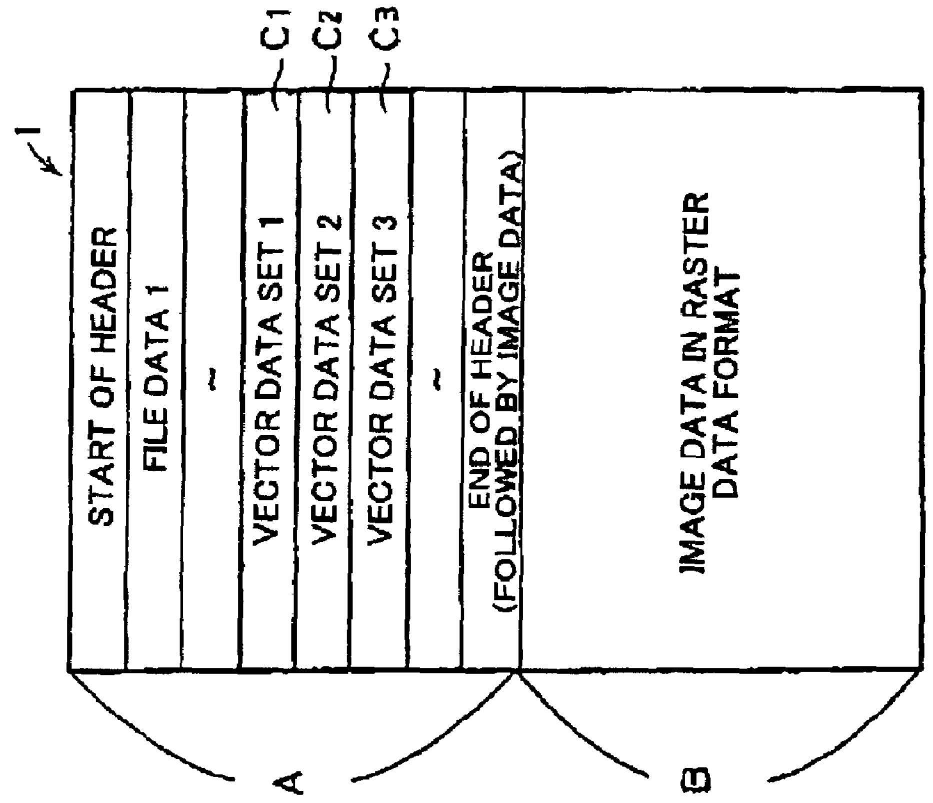
FIG. 9 includes explanatory diagrams showing the construction of a file in which a plurality of vector data sets is stored in the header A.
Figure 9A:
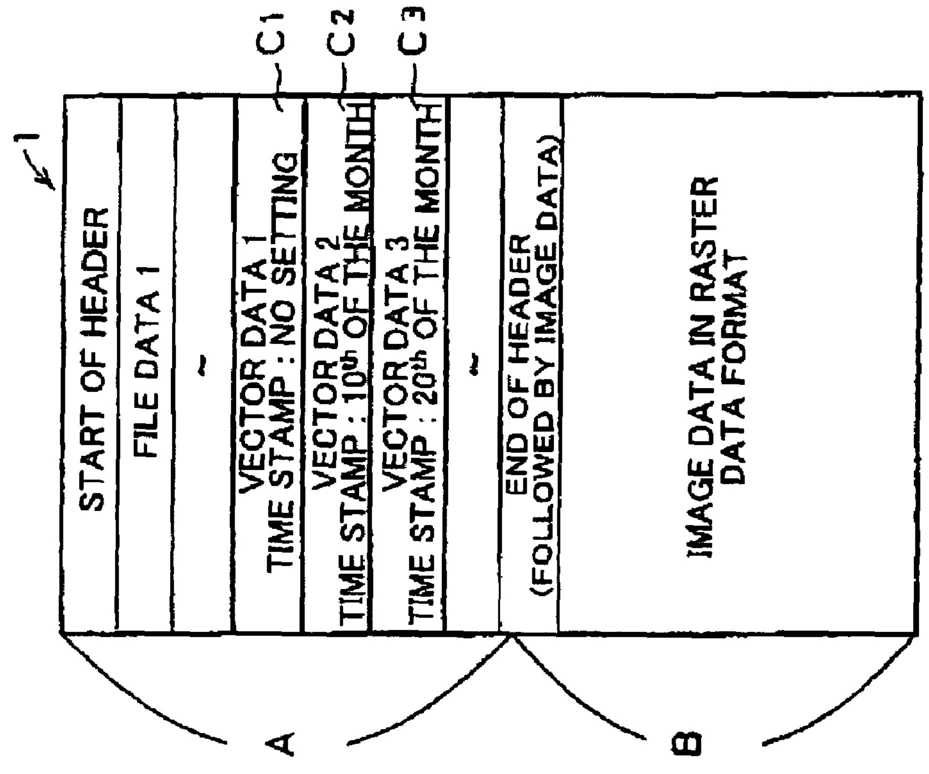
Figure 10A:
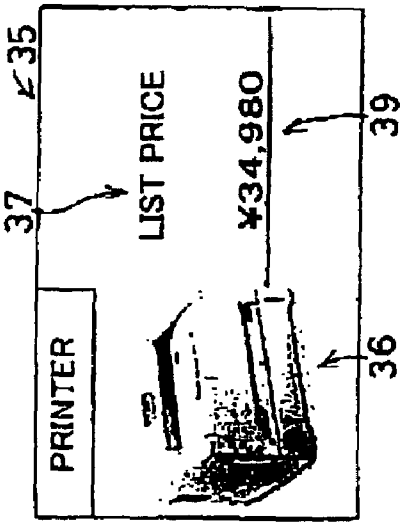
FIG. 10 includes example images displayed on the display device based on the data shown in FIG. 9(*a*)
Figure 10B:
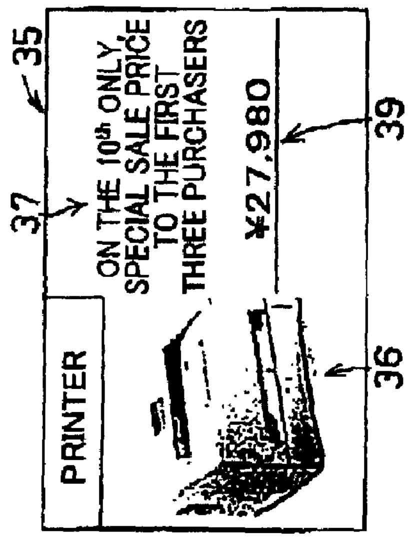
Figure 10C:
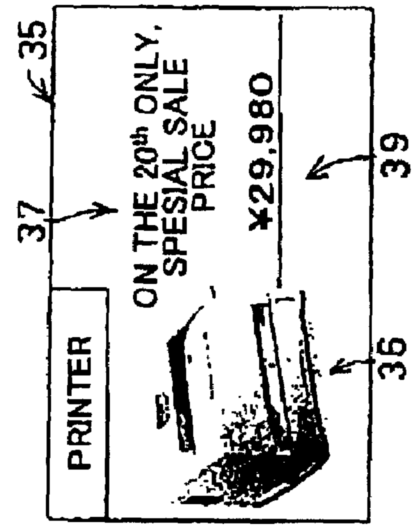

In this way, it is possible to automatically select suitable vector data to be superimposed on a raster data image based on the actual date and time. FIG. 9(*a*) shows an example of the file 1. This file 1 is an image file for a printer advertisement 35. Image data for the printer is stored in the first data area B as raster data, while vector data for various text is stored in areas C1, C2, and C3 of the header A, along with the time stamps "no setting," "the $10^{th}$ of the month," and "the $20^{th}$ of the month," respectively. When the processes in FIG. 4(*a*) and FIG. 8 are executed based on this file 1, the output shown in FIG. 10 appears on the display device 27. When the display date is something other than the $10^{th}$ or the $20^{th}$, then the output shown in FIG. 10(*a*) is displayed. When the display date is the $10^{th}$, the output shown in FIG. 10(*b*) is displayed. When the display date is the $20^{th}$, the output shown in FIG. 10(*c*) is displayed. A printer image 36 is displayed based on raster data, while text 37 and 39 is displayed based on vector data. Accordingly, it is possible to print a suitable advertisement based on the date by outputting the image displayed on the display device 27 via the printer 23.

Figure 11C:
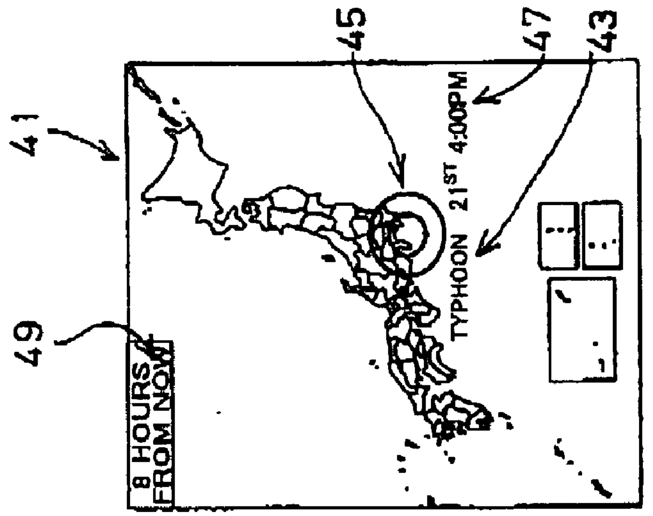
FIG. 11 includes example images displayed on the display device based on the data shown in FIG. 9(*b*)
Figure 11B:
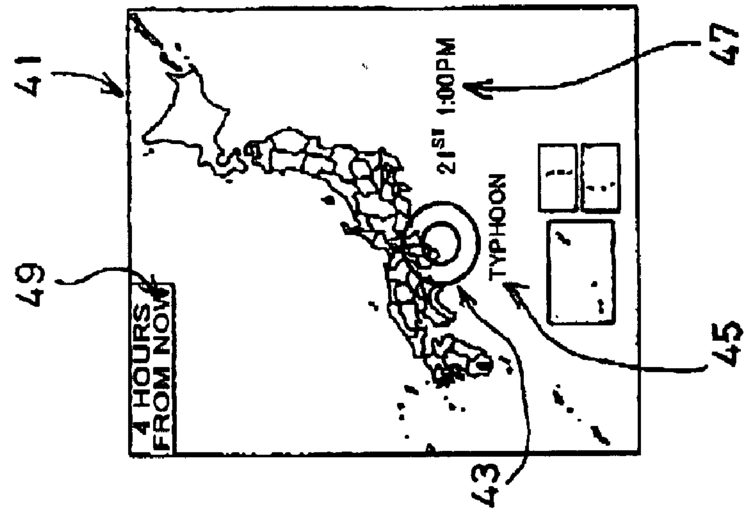
Figure 11A:
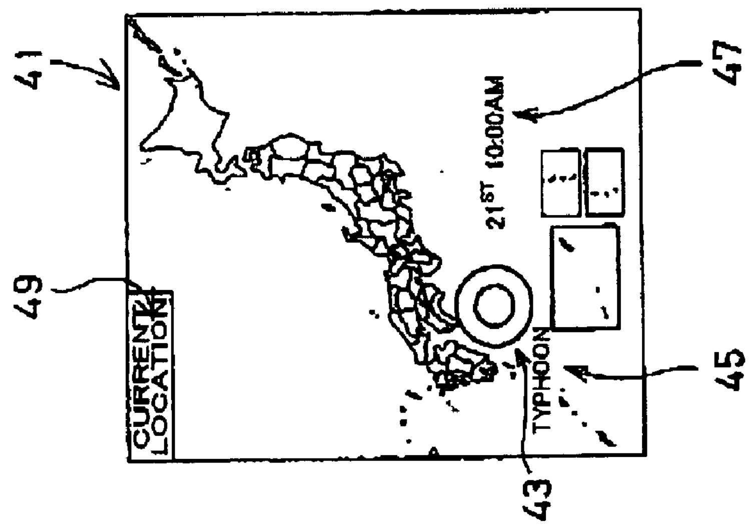

Next, an example will be given for forming an image based on the flowchart shown in FIG. 6. FIG. 9(*b*) shows an example construction of a file used in this process. The file 1 is used to show diagrams 41 relating to the predicted course of a typhoon on the display device 27 and includes image data depicting the entire region of Japan, stored in the first data area B as raster data, and vector data for various text and concentric circles indicating the position of the typhoon, stored in the areas C1, C2, and C3 of the header A. By executing the processes of FIG. 4(*a*) and FIG. 6 based on this file 1, output such as that shown In FIG. 11 appears on the display device 27. Hence, when the user specifies C1, the current position of the typhoon is displayed, as shown in FIG. 11(*a*). When the user specifies C2, the estimated position of the typhoon four hours from the current time is displayed, as shown in FIG. 11(*b*). When the user specifies C3, the estimated position of the typhoon eight hours from the current time is displayed, as shown in FIG. 11(*c*). At this time, the Japanese archipelago is displayed based on raster data, while concentric circles 43 and text 45, 47, and 49 are displayed based on vector data.

While the invention has been described in detail with reference to specific embodiments thereof, it would be apparent to those skilled In the art that many modifications and variations may be made therein without departing from the spirit of the invention, the scope of which is defined by the attached claims.

Figure 12:
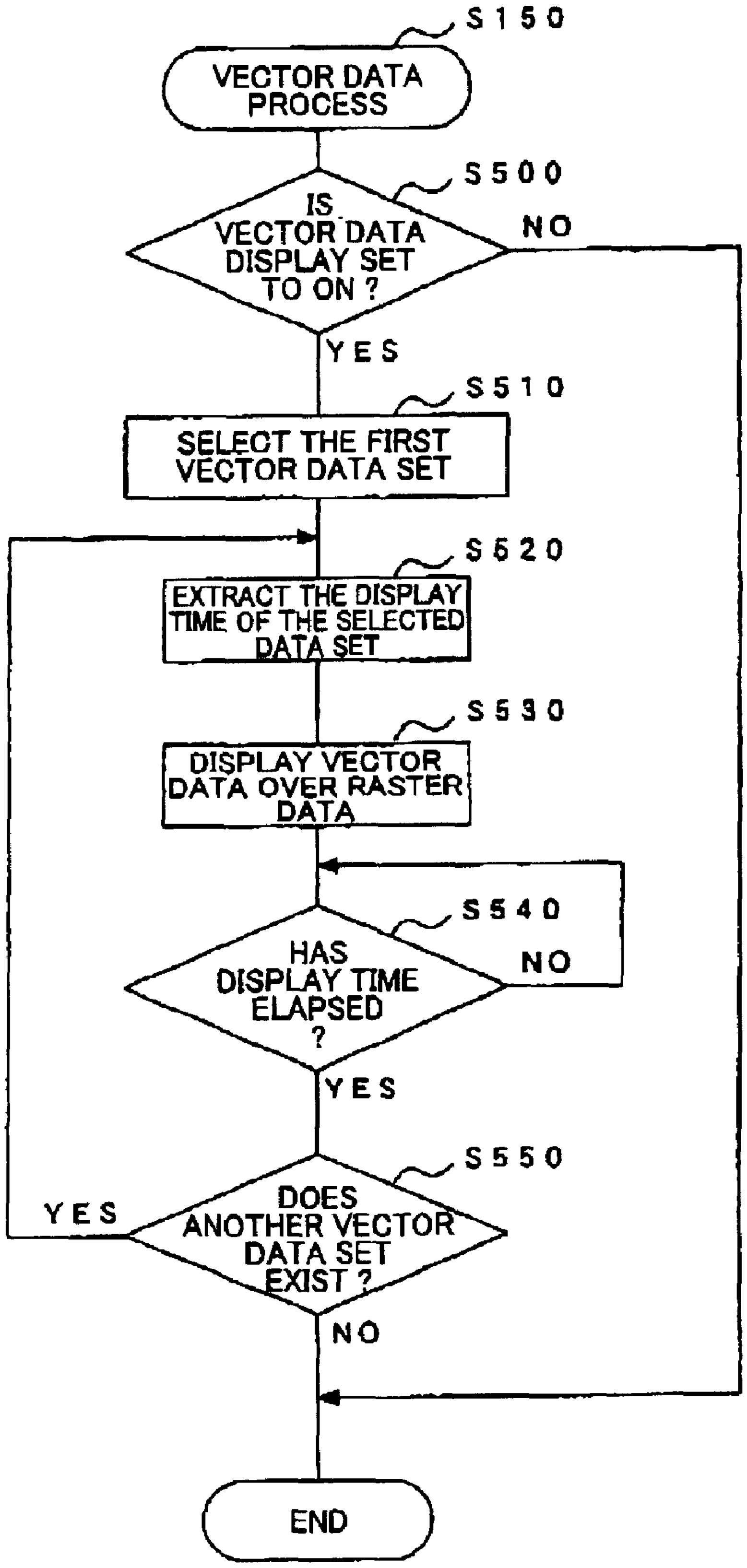
FIG. 12 is a flowchart describing a process for orderly changing displayed vector data at prescribed intervals.

For example, a display time could be embedded in each vector data in place of the time stamp in the file 1 shown in FIG. 7. FIG. 12 shows the vector data process for this type of file 1. This vector data process is similar to that of FIG. 8 in the part for determining whether or not the vector data display is set to ON, on the point for ending the process without performing any operations when the vector data display is set to OFF, and on the point for selecting the first vector data set (S510) when the vector data display is set to ON (Yes in S500).

In S520, the display time is extracted from the selected vector data set. In S530, a diagram based on this vector data set Is displayed over raster data displayed in S130. In S540, the process is paused until the display time extracted from the vector data set in S520 has elapsed. After the display time has elapsed, the CPU 11 determines in S550 whether another vector data set exists. If another set exists (Yes in S550), the process is repeated from S520 through S540, wherein the display time is extracted from the next vector data set. The process ends when another vector data set does not exist. This configuration facilitates the formation of video images.

In order to switch the vector data to be displayed next when displaying video images, it is also possible to embed a stamp (number or the like) for the current vector data and a stamp for the next vector data to be displayed in the vector data set.

The vector data process shown in FIG. 6 can be configured to select a plurality of vector data and display this plurality of vector data on the display device 27, superimposed on one another.

The text stored as vector data can be numerals that change in sequence used to create admission tickets for amusement parks or the like and lottery tickets. In addition to the image forming device 7, the present invention can be applied to a cellular telephone or a portable data terminal for displaying a combination of raster data and vector data.

The present invention can be employed to insert characters or diagrams into raster data or to superimpose vector data characters or diagrams over characters in raster data. In this way, the jagged text of raster data can be displayed when there is no printer 23, while the neat characters in vector data can be displayed when a printer 23 exists.

The conventional methods that have been used to incorporate text and diagrams in images include a method for saving data in a format capable of describing vector data for the text and diagrams, a method for re-saving descriptive data of text and diagrams of an image in an image file having a raster data format, and a method for storing raster data and vector data separately and combining these data at print time. The first method employing the vector data format requires more time for processing the data than the second method using an image file having a raster data format. When images are saved in the raster data format, on the other hand, the original image data may partly be lost. Further, text and diagrams in the images can become broken or jagged when the images are enlarged, reduced, rotated, or otherwise manipulated. The third method for storing raster data and vector data separately is difficult to incorporate since a plurality of data types must be exchanged. As described, the file used in the present invention facilitates data exchange and other data management as compared with the files used conventionally.

What is claimed is:

1. An image forming device comprising:

a display device having a screen;

a storage device for storing a file having a first data area for storing a first image data expressed as raster data and a second data area for storing data independent of the first image data including a second image data expressed as vector data, the second data area including a plurality of sectors for storing respective ones of a plurality of sets of the second image data individually;

a raster data display unit that forms an image on the screen of the display device based on the first image data of the file stored in the storage device; and a vector data display unit that forms an image on the screen of the display device based on one of the plurality of sets of the second image data of the file stored in the storage device, wherein the plurality of sets of the second image data is embedded in at least one of a header and a footer of the file.

2. The image forming device according to claim 1, further comprising a vector data display disabling unit that disables the vector data display unit so that the image based on the one of the plurality of sets of the second image data is not formed on the screen of the display device.

3. The image forming device according to claim 1, further comprising a second image data checking unit that checks whether the second data is stored in the second data area.

4. The image forming device according to claim 3, further comprising a vector data display disabling unit that disables the vector data display unit so that the image based on the one of the plurality of sets of the second image data is not formed on the screen of the display device when the second image data checking unit indicates that the second data is not stored In the second data area.

5. The image forming device according to claim 1, wherein the second image data is a set of coordinates determining a straight line or a curved line.

6. The image forming device according to claim 1, further comprising a vector data selecting unit that selects at least one set of the second image data to be displayed on the screen of the display device from the plurality of sets of the second image data.

7. The image forming device according to claim 6, further comprising an input device manually operated by an operator, wherein the vector data selecting unit comprises unit for prompting an operator to manually select the at least one set of the second image data through the input device.

8. The image forming device according to claim 6, wherein an indicia is further stored in association with each of the plurality of sets of the second image data and the vector data selecting unit selects the at least one set of the second image data based on the indicia.

9. The image forming device according to claim 8, wherein the indicia is time information.

10. The image forming device according to claim 8, further comprising vector data switching unit that switches one set of the second image data selected by the vector data selecting unit to another set of the second image data stored in one of the plurality of sectors of the second data area at a predetermined time interval.

11. A computer readable storage medium storing a set of program instructions executable on a data processing device and usable for operating an image forming device including a display device having a screen, and a storage device for storing a file having a first data area for storing a first image data expressed as raster data and a second data area for storing data independent of the first image data including a second image data expressed as vector data, the second data area including a plurality of sectors for storing respective ones of a plurality of sets of the second image data individually, wherein the plurality of sets of the second image data is embedded in at least one of a header and a footer of the file, instructions comprising:

accessing to the file stored in the storage device;

forming an image on the screen of the display device based on the first image data of the file stored in the storage device; and forming an image on the screen of the display device based on one of the plurality of sets of the second image data embedded in the at least one of the header and the footer of the file.

12. The storage medium storing a set of program instructions executable on a data processing device according to claim 11, instructions further comprising checking whether the second data is stored in the second data area, wherein when execution of the checking instructions indicate that the second data is stored in the second data area, the instructions for forming an image on the screen of the display device based on one of the plurality of sets of the second image data of the file stored in the storage device are executed whereas when execution of the checking instructions indicate that the second data is not stored in the second data area, the instructions for forming an image on the screen of the display device based on one of the plurality of sets of the second image data of the file stored in the storage device are not executed.

13. The storage medium storing a set of program instructions executable on a data processing device according to claim 12, wherein the instructions forming an image on the screen of the display device based on one of the plurality of sets of the second image data of the file stored in the storage device comprise skipping formation of the image on the screen of the display device based on the one of the plurality of sets of the second image data.

14. The storage medium storing a set of program instructions executable on a data processing device according to claim 13, instructions further comprising selecting at least one set of the second image data to be displayed on the screen of the display device from the plurality of sets of the second image data.

15. The storage medium storing a set of program instructions executable on a data processing device according to claim 14, wherein the selecting instructions comprise prompting an operator to manually select the at least one set of the second image data.

16. The storage medium storing a set of program instructions executable on a data processing device according to claim 15, wherein the selecting instructions select the at least one set of the second image data based on an indicia further stored in association with each of the plurality of sets of the second image data.

17. The storage medium storing a set of program instructions executable on a data processing device according to claim 16, wherein the indicia is time information.

18. The storage medium storing a set of program instructions executable on a data processing device according to claim 14, further comprising switching one set of the second image data selected through execution of the instructions to another set of the second image data stored in one of the plurality of sectors of the second data area at a predetermined time interval.

* * * * *